United States Patent
Rodrigues

(10) Patent No.: US 6,706,248 B2
(45) Date of Patent: Mar. 16, 2004

(54) CARBON NITROGEN NANOFIBER COMPOSITIONS OF SPECIFIC MORPHOLOGY, AND METHOD FOR THEIR PREPARATION

(75) Inventor: David Ernest Rodrigues, Malta, NY (US)

(73) Assignee: General Electric Company, Niskayuna, NY (US)

( * ) Notice: Subject to any disclaimer, the term of this patent is extended or adjusted under 35 U.S.C. 154(b) by 288 days.

(21) Appl. No.: 09/810,049

(22) Filed: Mar. 19, 2001

(65) Prior Publication Data

US 2002/0132117 A1 Sep. 19, 2002

(51) Int. Cl.$^7$ .................................................. C01C 3/02
(52) U.S. Cl. ..................................... 423/384; 423/447.1
(58) Field of Search ................................ 423/384, 364, 423/439, 447.1; 502/174

(56) References Cited

U.S. PATENT DOCUMENTS

| | | | | |
|---|---|---|---|---|
| 4,649,038 A | * | 3/1987 | Labes et al. | 423/364 |
| 4,663,230 A | | 5/1987 | Tennent | |
| 4,855,091 A | | 8/1989 | Geus et al. | |
| 4,908,198 A | * | 3/1990 | Weinberg | 423/415.1 |
| 5,165,909 A | | 11/1992 | Tennent et al. | |
| 6,099,960 A | * | 8/2000 | Tennent et al. | 428/367 |

* cited by examiner

*Primary Examiner*—Stanley S. Silverman
*Assistant Examiner*—Edward M. Johnson
(74) *Attorney, Agent, or Firm*—Andrew J. Caruso; Patrick K. Patnode

(57) ABSTRACT

Carbon-nitrogen nanofibers are prepared by contacting a gaseous mixture comprising hydrogen and a carbon-nitrogen compound such as pyridine with a cobalt-iron catalyst at a temperature in the range of about 500–1000° C. The nanofibers are characterized by a structure in which layers emanate from a core catalyst particle and are parallel to each other but not parallel to the length axis of the nanofibers.

5 Claims, 3 Drawing Sheets

CARBON NITROGEN NANOFIBER COMPOSITIONS OF SPECIFIC MORPHOLOGY, AND METHOD FOR THEIR PREPARATION

BACKGROUND OF THE INVENTION

This invention relates to carbon-nitrogen nanofibers and methods for their preparation.

Carbon nanofibers are known in the art, their preparation being described in a large number of patents and other literature. They are typically cylindrical tubes with graphitic walls of a diameter between about 3.5 and about 500 nm, having a hollow core which may be filled with amorphous carbon. They are commercially available from Hyperion Catalysts International, Inc., and are useful as fillers for resinous materials, and often impart conductivity to said materials.

Carbon nanofibers may be prepared by the catalytic reaction of a hydrocarbon gas with hydrogen in the presence of a transition metal catalyst. Typical reaction temperatures are in the range of about 500–1,500° C. The size of the fibers is largely dependent on the particle size of the catalyst employed. Typical methods of preparing such nanofibers are disclosed, for example, in U.S. Pat. Nos. 4,663,230, 5,165,909 and 5,500,200.

The microstructures of the nanofibers most often obtained according to the prior art are of two types. In the first microstructure, hereinafter sometimes designated "fishbone", the layers of graphite on the surface of a nanofiber emanate from a core region and are parallel to each other but not parallel to the length axis of the nanofiber. In the second microstructure, hereinafter sometimes designated "parallel", the graphite layers are parallel both to each other and to the length axis of the nanofiber. Typical d-spacings (i.e., distances between the centers of carbon layers) are on the order of 3.43 Å for the fishbone microstructure and 3.47–3.50 Å for the parallel microstructure, as determined by x-ray scattering.

Similar nanofibers, also designated "nanotubes", comprising carbon and nitrogen have been reported in Sen et al. *Chemical Physics letters*, 287, 671–676 (1998). They were prepared by bubbling argon gas through a carbon-nitrogen compound such as pyridine and conducting the resulting vapors over a cobalt powder catalyst at 750° C.

These nanofibers exhibit variability in microstructure, having many defects that suggest formation by a mechanism similar to the "slip-stick" phenomenon encountered in adhesion phenomena. Such variability can affect the performance of the nanofibers as fillers and conductive materials.

It is of interest, therefore, to produce carbon-nitrogen nanofibers having a more regular microstructure than that demonstrated in the prior art materials.

SUMMARY OF THE INVENTION

The present invention includes carbon-nitrogen nanofibers having a fishbone microstructure. Also included is a method for preparation of such nanofibers.

One aspect of the invention is compositions comprising carbon-nitrogen nanofibers in which the structural layers emanate from a core catalyst particle and are parallel to each other but not parallel to the length axis of the nanofibers.

Another aspect is a method for preparing a carbon-nitrogen nanofiber composition which comprises contacting, at a temperature in the range of about 500–1000° C., a gaseous mixture comprising hydrogen and a carbon-nitrogen compound with a catalyst comprising cobalt and iron.

Still another aspect is resinous compositions comprising a thermoplastic or thermosetting resin as the continuous phase and a carbon-nitrogen nanofiber composition as described hereinabove.

DETAILED DESCRIPTION; PREFERRED EMBODIMENTS

The carbon-nitrogen nanofibers present in the compositions of this invention are characterized by the fishbone microstructure characteristic of many carbon nanofiber compositions. That is, the layers of carbon-nitrogen material therein emanate from a core region and are parallel to each other. They are not, however, parallel to the length axis of the nanofibers, extending rather in oblique directions with respect to said axis.

Figure 1:
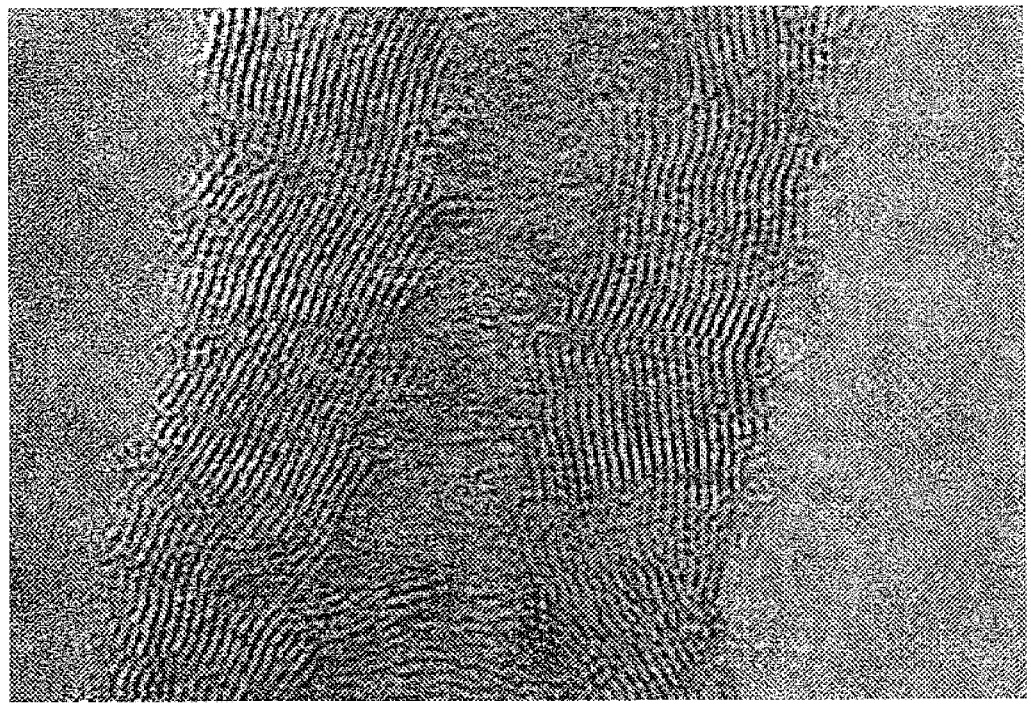
FIG. 1 is a photomicrograph of a carbon-nitrogen nanofiber composition of the invention, showing the fishbone morphology thereof.

This is apparent from FIG. 1. It can be seen that the orientation of the fiber is generally in the 1 o'clock direction. The layers of material therein, however, are disposed in several other directions, mostly at fairly small angles of displacement from the axis.

Figure 2:
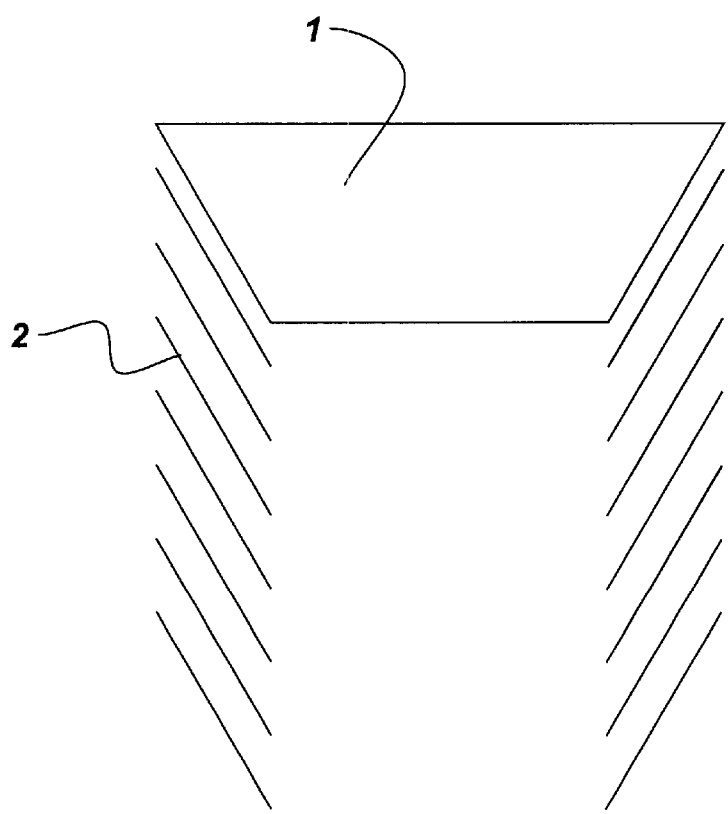
FIGS. 2 and 3 are schematic depictions of nanofibers with fishbone structures, as produced by the prior art and by the method of this invention respectively.
Figure 3:
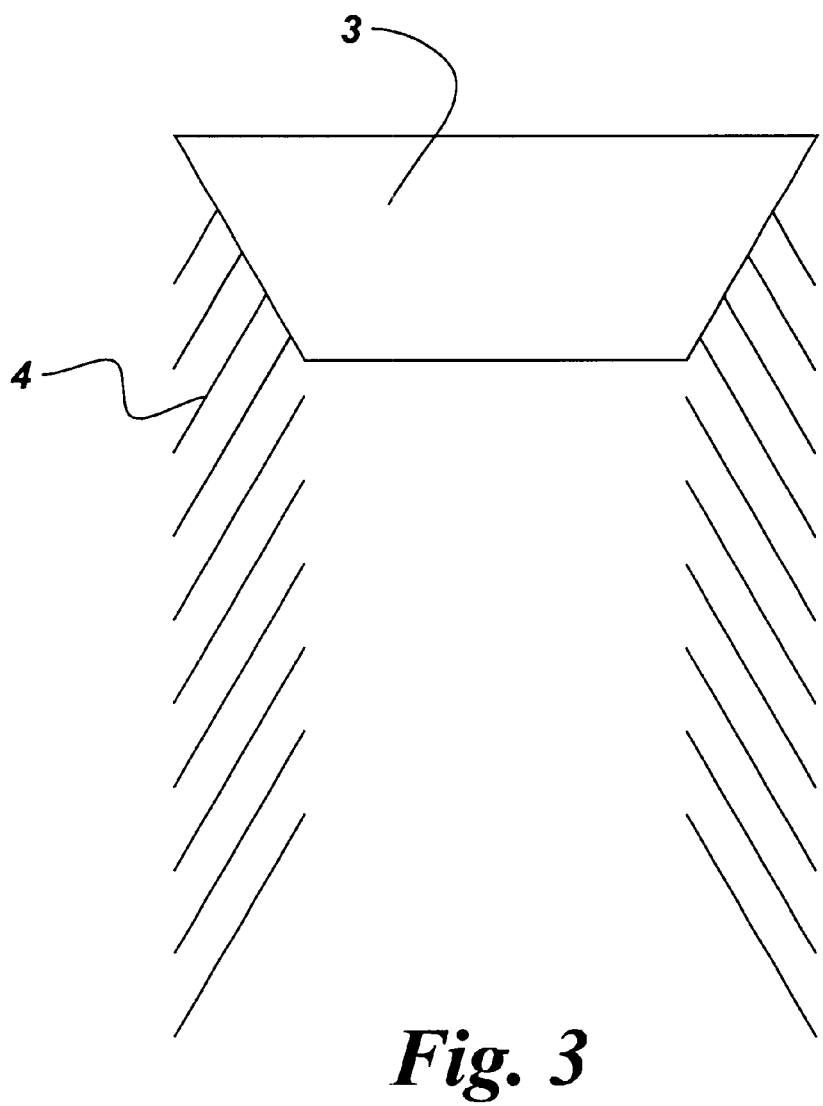

FIGS. 2 and 3 schematically depict the orientation of fishbone-structure nanofiber planes according to the prior art and according to the method of the invention. As shown in FIG. 2, the planes 2 of the prior art nanofibers are generally disposed parallel to a catalyst particle 1. FIG. 3 shows that the planes 4 of the nanofibers of this invention, by contrast, are disposed generally projecting from catalyst particle 3. The angle of disposal may be up to about 160°.

The nanofiber compositions of this invention may be prepared by contacting a gaseous mixture comprising hydrogen and a carbon-nitrogen compound with a catalyst. The most suitable carbon-nitrogen compound is generally pyridine, although others, of which pyrazine and pyrimidine are exemplary, may be substituted therefor. It is frequently convenient to incorporate an inert gas, such as argon or helium, in the gaseous mixture. Most often, the carbon-nitrogen compound is entrained in the inert gas for contact with the catalyst; the hydrogen may be supplied separately or may be combined with the inert gas. Volume ratios of inert gas to hydrogen in the range of about 1–20:1 are typical.

The catalyst employed according to the invention comprises cobalt and iron. It is generally supplied as an alloy of the two metals. Preferably, said alloy is coated on an inert support material such as fumed alumina.

Catalysts suitable for use in the method of the invention may be prepared by dissolving salts of iron and cobalt in a suitable solvent, typically water or an alkanol such as methanol or a mixture thereof, slurrying the resulting solution with the support material, evaporating the solvent and reducing the resulting solid. Reduction may be by contact with hydrogen in an oven, generally at a temperature in the range of about 150–300° C. The molar ratio of cobalt to iron in the catalyst is typically in the range of about 1–10:1.

Rates of passage of the gaseous mixture over the catalyst can be in the range of about 2–10 SCFH (standard cubic feet per hour) for the inert gas, if any, and about 2–10 SCFH for the hydrogen. The carbon-nitrogen compound will thus be supplied at the rate inherently provided by passage of one of the other gases through it in the liquid form. Suitable reaction temperatures are in the range of about 500–1000° C., preferably about 600–800° C. The product contains catalyst in addition to the nanofibers of the invention; it is, for most purposes, unnecessary to remove the catalyst.

The nanofibers of the present invention may be employed as fillers, often conductive, for thermoplastic and thermosetting resins of all types. The polymeric continuous phases of the resulting filled compositions may be addition or condensation polymers. Typical polymers which may be employed are polyphenylene ethers, polyesters, polyamides and blends thereof. Preparation of the filled compositions may be by conventional methods. The proportion of nanofiber in the filled composition is most often in the range of about 0.5–25% by weight.

The preparation of the carbon-nitrogen nanofibers of the invention is illustrated by the following examples.

EXAMPLE 1

A mixture of 40 ml of 0.5 M aqueous cobalt(II) nitrate and 8 ml of 0.5 M aqueous iron(III) nitrate in 80 ml of methanol was slurried with 9.6 g of fumed alumina. The slurry was stirred at 50° C. until most of the alcohol evaporated. After drying in a hood for 12 hours, the solids was reduced with hydrogen in an oven at 200° C. for 12 hours. The slurry was ground in a blender.

A 2.45-g portion of the catalyst powder was heated in an oven at 680° C. Argon was passed through pyridine at 5 SCFH and the resulting vapors were passed through the oven; hydrogen was also passed through at 4 SCFH. Total passage time was 30 minutes. The black product was the desired carbon-nitrogen nanofiber composition (2.51 g); it was found to have a microstructure as illustrated in FIG. 1, with orientation with respect to catalyst particles as shown in FIG. 3.

EXAMPLE 2

The procedure of Example 1 was repeated, using 1.84 g of catalyst and a hydrogen flow rate of 0.5 SCFH. The carbon-nitrogen nanofiber product weighed 2.32 g.

EXAMPLE 3

The procedure of Example 1 was repeated, using 1.3 g of catalyst, a hydrogen flow rate of 1 SCFH and a temperature of 630° C. The carbon-nitrogen to nanofiber product weighed 2.41 g.

What is claimed is:

1. A method for preparing a carbon-nitrogen nanofiber composition, said method comprising:

passing an inert gas through a liquid carbon-nitrogen compound selected from the group consisting of pyridine, pyridazine, and pyrimidine to produce a vapor stream containing entrainment of said carbon-nitrogen compound; and contacting said vapor stream with hydrogen and a supported cobalt-iron catalyst in an oven maintained at a temperature in the range of about 600–800° C.;

wherein said catalyst comprises cobalt and iron in a molar ratio in the range of about 1:1 to about 10:1.

2. The method according to claim 1, wherein the supported cobalt-iron catalyst comprises fumed alumina as a catalyst support.

3. The method according to claim 1, wherein said vapor stream is contacted with hydrogen prior to contact with said catalyst in said oven.

4. The method according to claim 1, wherein said vapor stream, hydrogen, and catalyst are simultaneously contacted with each other in said oven.

5. The method of claim 1, wherein said catalyst is not removed from said carbon-nitrogen nanofiber composition.

* * * * *